(12) United States Patent
Lee

(10) Patent No.: US 6,542,963 B2
(45) Date of Patent: Apr. 1, 2003

(54) PARTIAL MATCH PARTIAL OUTPUT CACHE FOR COMPUTER ARITHMETIC OPERATIONS

(75) Inventor: Hoi-Jin Lee, Sungnam-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 46 days.

(21) Appl. No.: 09/757,789

(22) Filed: Jan. 10, 2001

(65) Prior Publication Data

US 2002/0120814 A1 Aug. 29, 2002

(51) Int. Cl.$^7$ .............................................. G06F 13/00
(52) U.S. Cl. ........................ 711/118; 711/123; 711/128; 708/605
(58) Field of Search ................................. 711/125, 128, 711/123, 118; 712/23; 708/605

(56) References Cited

U.S. PATENT DOCUMENTS

| | | | |
|---|---|---|---|
| 4,734,878 A | 3/1988 | Sutcliffe | ...................... 708/605 |
| 5,537,560 A * | 7/1996 | Boggs et al. | .................. 712/23 |
| 6,253,287 B1 * | 6/2001 | Green | ......................... 711/118 |
| 6,343,359 B1 * | 1/2002 | Col et al. | .................... 711/123 |

OTHER PUBLICATIONS

Israel Korn, "Computer Arithmetic Algorithms", Chapter 7, ISBN D–13–151952–2, pp. 147–149, 1993.

* cited by examiner

Primary Examiner—Hong Kim
(74) Attorney, Agent, or Firm—F. Chau & Associates, LLP

(57) ABSTRACT

An arithmetic device having a cache for performing arithmetic operations is provided. The cache stores previously performed resultant data and operand for an arithmetic operation and upon receiving a same operand to be operated upon, the corresponding stored resultant data is output, bypassing the arithmetic processing and operation by the processor. The device having the cache is also configured for outputting a partial resultant output for a partially matched operand.

17 Claims, 5 Drawing Sheets

Fig. 4

| Minterm<br>X xnor X' | Det_n | SQRT<br>Mask_n | DIV<br>Mask_n |
|---|---|---|---|
| 0xxx_xxxx | 0000_0000 | 0000_0000 | 0000_0000 |
| 10xx_xxxx | 1000_0000 | 0000_0000 | 1000_0000 |
| 110x_xxxx | 1100_0000 | 1000_0000 | 1100_0000 |
| 1110_xxxx | 1110_0000 | 1000_0000 | 1110_0000 |
| 1111_0xxx | 1111_0000 | 1100_0000 | 1111_0000 |
| 1111_10xx | 1111_1000 | 1100_0000 | 1111_1000 |
| 1111_110x | 1111_1100 | 1110_0000 | 1111_1100 |
| 1111_1110 | 1111_1110 | 1110_0000 | 1111_1110 |
| 1111_1111 | 1111_1111 | 1111_1111 | 1111_1111 |

Fig. 5

| Match_info<br>(X xor X') and X | Det_n | MUL<br>Mask_n |
|---|---|---|
| 0000_0000 | 1111_1111 | 1111_1111 |
| else | 0000_0000 | 0000_0000 |

PARTIAL MATCH PARTIAL OUTPUT CACHE FOR COMPUTER ARITHMETIC OPERATIONS

BACKGROUND OF THE INVENTION

1. Field of the Invention

The present invention relates to a device and method for performing arithmetic operations with cache memory; more particularly a device and method having a cache memory capable of partial output.

2. Discussion of Related Art

Computers perform arithmetic operations such as multiple, divide by manipulating data through repeated shifts, additions, and subtractions. Numerous accesses of data and operational cycles are needed to arrive at the result. For more complex operations such as 'square root' and performing trigonometry functions, the traditional computing process is very time consuming and in some applications, it becomes not feasible to implement.

Some of the more complex arithmetic functions can be implemented by look-up tables, but the table must be large enough to accommodate many different operands. If there are differences in the operand to be operated upon, even a difference of a single bit, the look-up table would not work. The data from the look-up table would be erroneous. To obtain a correct result, the entire calculation must be performed for every digit of the operand.

Other implementations include use of dedicated circuitry. See, for example, U.S. Pat. No. 4,734,878 to Sutcliffe, "CIRCUIT FOR PERFORMING SQUARE ROOT FUNCTIONS". Although less time consuming, dedicated circuitry require extra hardware and can be used only for the specified functions. That is, the Sutcliffe device can only perform square roots, a multiplier can only be used for multiplication, etc.

A cache memory is a high-speed random access memory (RAM) that a (CPU) can access more quickly than it can access regular memory. The cache memory is typically used to store data, which are frequently accessed by the CPU. The more operations a CPU can perform with data from cache memory, the speedier the operations can be performed as compared to operations with data accessed from regular memory.

The cache memory is directly accessed by the CPU (rather than via, for example, an external memory management unit) and is situated physically close to the CPU, some caches being on the CPU chip, to reduce the signal propagation time between the CPU and the cache memory. Descriptions of the operations of data cache such as in an Alpha AXP 21064 microprocessor can be found in "Computer Architecture A Quantitative Approach", by David A. Patterson and John L. Hennessy, 1996, Morgan Kaufmann Publishers, Inc., pp. 380–383. When the CPU performs a read or a fetch operation, it will first check to see if the data or instructions it requests is in the cache. The data or instruction is accessed quickly if it is in the cache. Otherwise, the data or instructions must be fetched from regular memory (DRAM or ROM) and more time is consumed.

A conventional cache is illustrated in FIG. 1. Cache memory 10 includes a cache tag 11, which includes a plurality of buffers for storing data, addresses, or files frequently or recently accessed by the processor. Cache memory 10 includes circuitry for comparing newly input data against the data stored in the tag. As shown in FIG. 1, an exclusive OR gate is associated with each bit of each buffer in cache tag 11. When it is determined that the newly input data matches the data stored in one of the buffers in cache tag 11, a true comparison is output at gates 15, 16, . . . 19. Cache data 12 is a file which stores data corresponding to each buffer in cache tag 11. Upon receiving a true comparison signal from a corresponding gate 15, 16, . . . 19, the data in the corresponding location of cache data 12 is output as q4, q3, q2 . . . q0. The cache shown in FIG. 1 is 5 bits wide.

It can be seen that the characteristics of the cache memory may be useful as a data-storing device for an arithmetic device to perform high-speed calculation. For example, the cache memory such as one shown in FIG. 1, stores operands in cache tag 11 and corresponding calculating results in cache data 12. The arithmetic operation is bypassed if an operand on which the same arithmetic operation is to be performed is found in cache tag 11. In such case, the cache is used as a look-up table, with access time reduced as compared to a look-up table ROM. However, as in the case of a look-up ROM, usage of the cache in a look-up table mode will cause reduction in overall throughput if the approach only works when the operands match exactly with stored cache tag data.

Accordingly, a need exists for a device having a cache memory used in place of an arithmetic unit, which is capable of partial output of calculation results for partially matched operands.

SUMMARY OF THE INVENTION

A method of performing arithmetic operation using a cache structure having a TAG register and a cache data memory, the method comprising the steps of storing in the TAG register a plurality of known operands, each having a corresponding resultant derived from an arithmetic operation, the resultant being stored in a corresponding location in the cache data memory; inputting a new operand on which the arithmetic operation is to be performed to the TAG register; comparing the new operand to the plurality of the known operands; and determining if the new operand matches any of the known operands and if there is a match, outputting from the cache data memory the known resultant corresponding to the known operand that matched the new operand.

The method preferably further including the steps of: if there is no match in the determining step, determining if there are partial matches between the known operands and the new operand; selecting the known operand having the MSBs matching the MSBs of the new operand; accessing from the cache data memory the resultant corresponding to the known operand having the most matched MSBs; determining a first portion of the accessed resultant derived from the matched MSBs of the known operand; masking a second portion of the accessed resultant which is other than the first portion; and providing as a first partial resultant the masked resultant.

The method still further preferably including the steps of performing the arithmetic operation on bits of the new operand other than the matched MSBs to produce a second partial resultant; and outputting a complete resultant by combining the first partial resultant with the second partial resultant.

Advantageously, the illustrative methods according to the present invention are applicable to arithmetic operations such as square root, division, or multiplication.

A cache device is also provided for performing arithmetic operation comprising: a tag register for storing a plurality of known operands, each having a corresponding resultant derived from an arithmetic operation; A cache data memory for storing resultants corresponding to the known operands; Comparison logic in the tag register for comparing a new operand on which the arithmetic operation is to be performed against the plurality of the known operands, wherein if the new operand matches any of the known operands, the cache data memory outputs the known resultant corresponding to the known operand that matched the new operand.

The cache device preferably further including: a logic group detector for detecting a group of data having a common logic level, the logic group detector for detecting the known operand having the highest number of MSBs matching the MSBs of the new operand; masking logic for partially masking the resultant corresponding to the known operand having the most matched MSBs, the masking logic for passing a first portion of the corresponding resultant derived from the matched MSBs of the known operand and for masking a second portion of the corresponding resultant which is other than the first portion; and a multiplexer for multiplexing the first portion of the corresponding resultant into an arithmetic unit.

The cache device according to the present invention, further preferably including a second multiplexer, wherein the arithmetic unit performs the arithmetic operation on bits of the new operand other than the matched MSBs to produce a second portion resultant, the second multiplexer for multiplexing the second portion resultant into the arithmetic unit, wherein the second portion resultant is combined to the first portion resultant to form a complete resultant.

BRIEF DESCRIPTION OF THE DRAWINGS

FIG. 4 is a table of input and output data of a detect logic in the cache memory of FIG. 2 and a masking operation according to the present invention;

FIG. 5 is an illustrative table of input and output data of a detect and masking operation according to a multiplication embodiment of the present invention.

DESCRIPTION OF PREFERRED
EMBODIMENTS OF THE INVENTION

An operational cache according to the present invention stores resultant data of a previous arithmetic calculating result and outputs the resultant data if the current operand is the same as a previous operand on which the same arithmetic operation is performed. The present invention also output from the operational cache partial resultant data if the current operand partially matches the operand previously stored in the operational cache. The structure and operation of arithmetic units using an operational cache according to the present invention are shown and described below.

Figure 1:
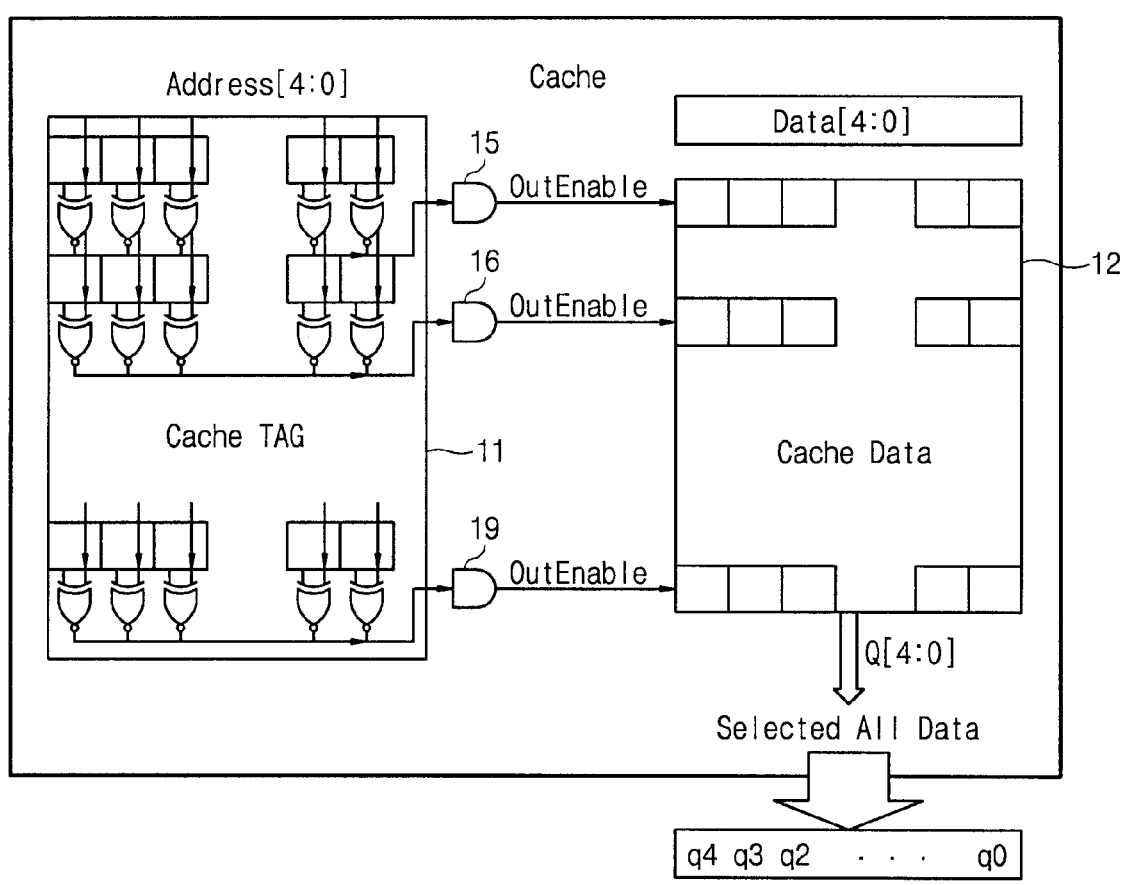
FIG. 1 shows a conventional cache memory.
Figure 2:
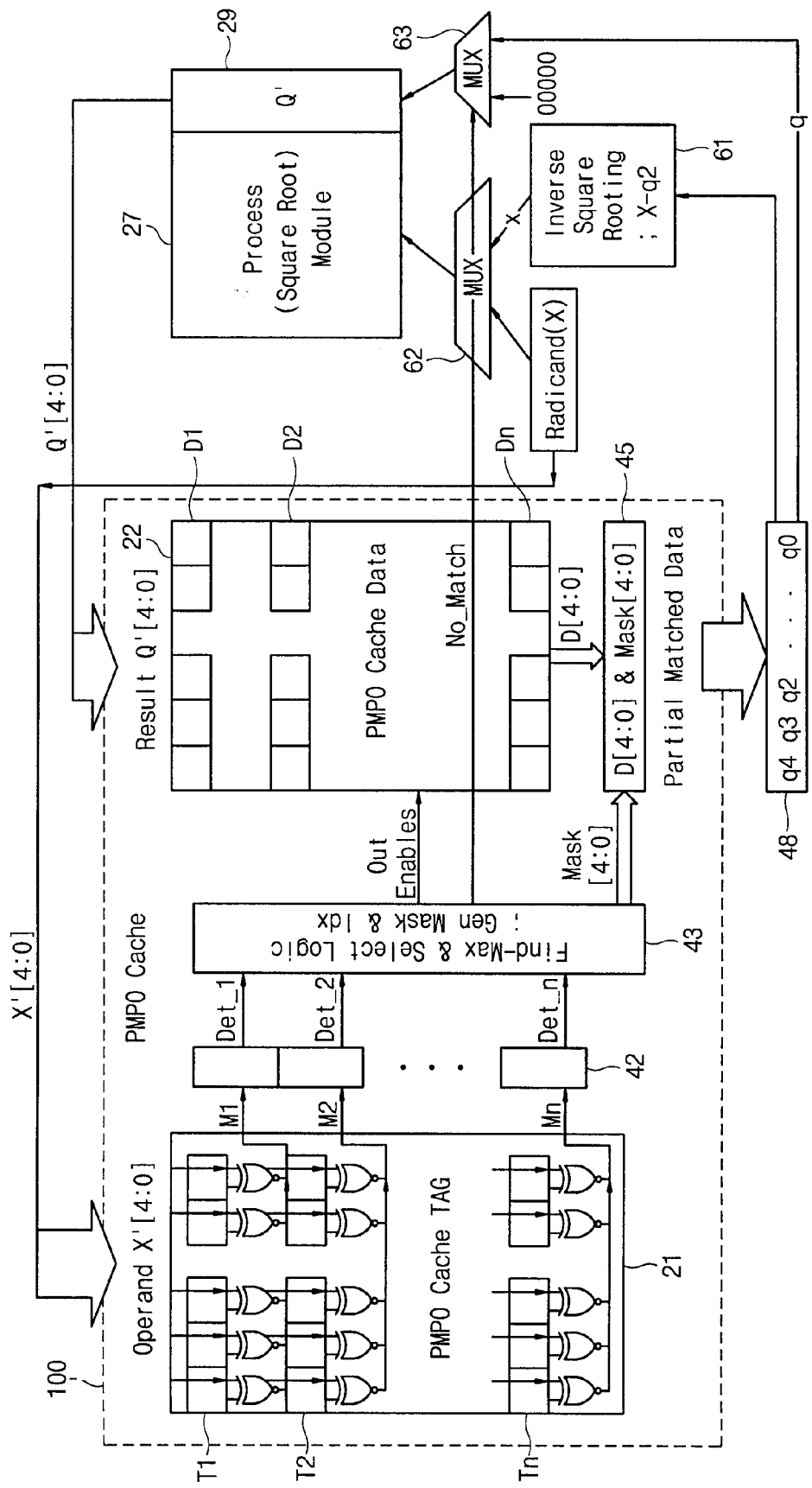
FIG. 2 shows an arithmetic device having a cache according to an embodiment of the present invention.
Figure 3:
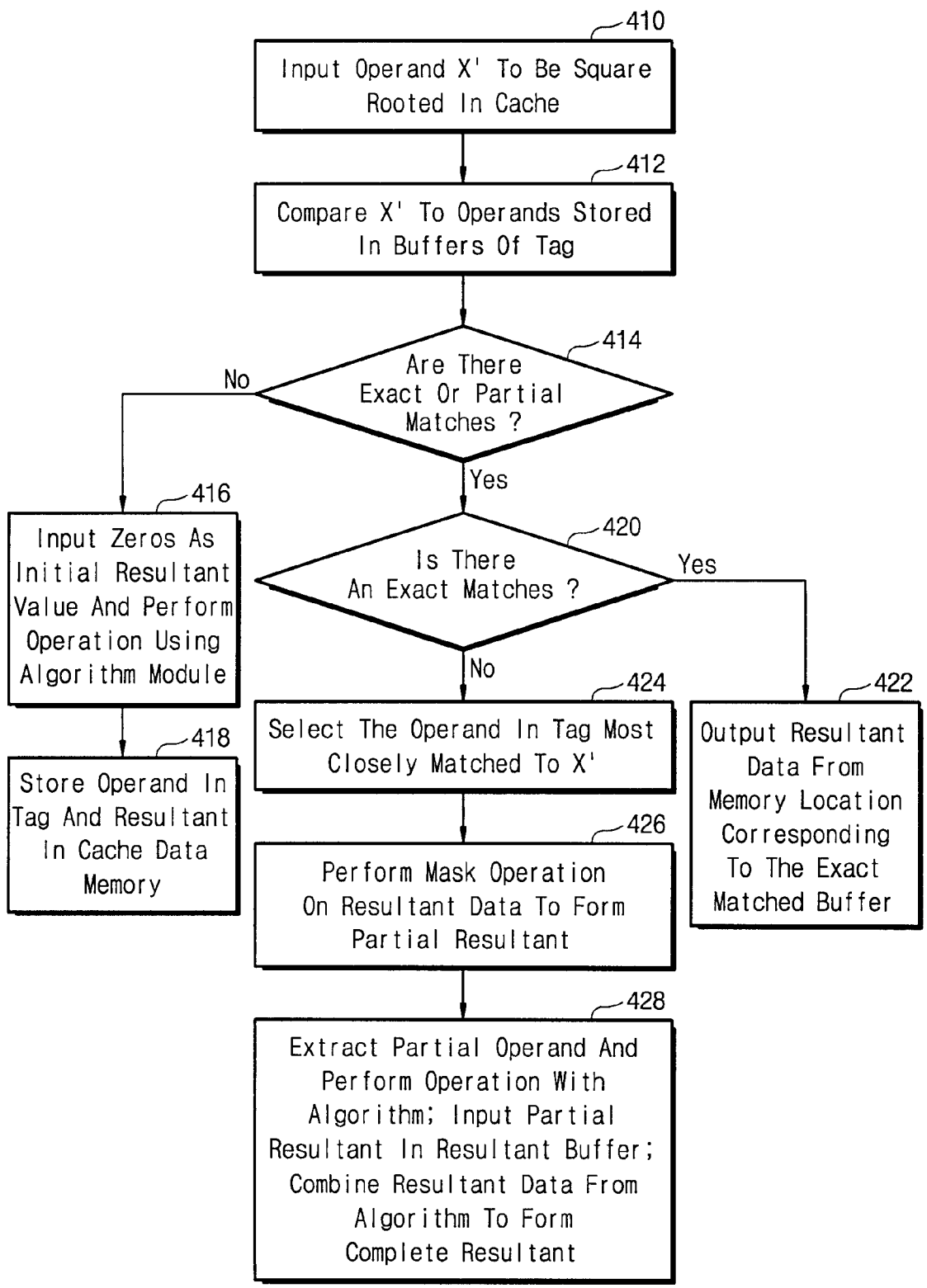
FIG. 3 is an illustrative flow diagram of a square root operation using the device of FIG. 2.

FIG. 2 shows an arithmetic unit for performing a square root operation. The arithmetic unit as shown includes a partial match partial output (PMPO) cache according to an embodiment of the present invention. The illustrative arithmetic device according to this embodiment includes a PMPO cache 100 having PMPO cache tag 21 and PMPO cache data 22. A square root module 27 is a software or hardware module for calculating the resultant square root of a given number X (radicand). The square root module preferably includes programming steps or algorithm for performing known square root operation, such as a "completing the square" method for square root extraction, which is conceptually similar to the restoring division scheme See Israel Koreans 'Computer Arithmetic Algorithms' Chapter 7, ISBN D-13-151952-2, 1993. The square root module 27 also includes circuitry or program steps for calculating a square root for a radicand input by traditional divisional and remainder approach. As an illustration, a processor executing a 'divisional and remainder' square root operation on an 8 bit operand typically requires 8 cycles to obtain the resultant square root data. The resultant data is assembled in Q' buffer 29. Upon completing a square root operation, the resultant square root data is forwarded from the Q' buffer 29 to one of D1, D2 . . . Dn in PMPO cache data 22 for storage. The radicand X is also stored in the corresponding buffer T1, T2, . . . Tn in PMPO cache tag 21. In such configuration, the arithmetic unit of FIG. 2 will output a square root Q' from PMPO cache data 22 when it is determined that the newly input radicand X' to be square rooted matches the radicand X' in the corresponding buffer in PMPO cache tag 21. The matching of the new radicand is performed by the exclusive NOR gates in cache tag 21, which will output all ones for a buffer having each bit of X which matches each bit exactly with the newly input radicand X'. The data stored in the location in cache data 22 corresponding to X in the buffer T1, T2, . . . Tn having the exact match to the radicand X' is output as resultant square root Q'. In such case, Q' is output from cache data 22 directly through multiplexer 63 to Q' buffer 29. Such direct match and outputting of the resultant square root data to Q' buffer 29 bypasses the processing in square root module 27.

The arithmetic unit having a PMPO cache according to the present invention shown in FIG. 2 is also configured for outputting a partial square root output when there is a partial match between the newly input operand X' and the plurality of operand Xs stored in buffers T1, T2, . . . Tn of cache tag 21. The operations of the partial output partial match (PMPO) embodiment is described with reference to FIGS. 2 to 5. Upon receipt of a new operand X' to be square rooted (step 410), the operand X' is compared to the Xs stored in buffers T1, T2, . . . Tn in PMPO cache tag 21 (step 412). For purposes of the present illustration, the operand and the square root data are 8 bits, e.g., X'[7:0] and Q'[7:0]. It would be readily apparent to one ordinarily skilled in the art that the PMPO cache of FIG. 2 is applicable to operands of any width. The exclusive NOR gates of cache tag 21 are connected to detect logic 42, which is preferably implemented with 8 bit buffers, one for each buffer Tx, for storing the 8 bits output from a respective exclusive NOR buffer group. Thus, if there is an exact match of operand X' to X in any of the buffers in cache tag 21, the corresponding circuit in detect logic 42 will register all ones in its 8 bit buffer. It is also readily apparent to one skilled in the art that if exclusive OR gates were used in cache tag 21, the detect logic will register all zeros for an exact match. If there is only a partial match, the detect logic 42 will show a logic '1' in bits of Xn in cache tag 21 which match the bits of operand X'. A determination is made in step 414 as to whether there is a complete or partial match of the newly input operand X' to the plurality of operands X stored in buffers of cache tag 21. Select and mask logic 43 includes logic circuitry for decoding Det_1, Det_2, . . . Det_n and determine whether there is an exact or a partial match. If there is a partial match, the extent of the match is also determined. Select and mask logic 43 outputs the appropriate enable signals to cache data 22 and mask register 45. An exact match of the operand X' is found when any of the Det_1, Det_2, . . . Det_n signals from detect logic 42 includes all ones. If there is no exact or partial match, the PMPO cache 100 outputs a signal to indicate that there will be no square root data from cache 100. A no match signal is sent to MUXs 62 and 63, wherein the newly input radicand X' is input to the square root module 27 and a normal square root operation is performed by square root module 27 with the operand X' (step 416). The resultant data derived from processing on module 27 will be forwarded to cache data 22 for storage in a location corresponding to a Tx buffer in cache tag 21, which is used to store the operand X' just operated upon (step 418).

If there is a partial or an exact match, the Det_1, Det_2, Det_n signals from detect logic 42 are checked to see if there is an identical match (step 420). If there is an identical match, select and mask logic 43 will output a signal to the location in cache data 22 corresponding to the buffer having the exact match in cache tag 21. In this case, mask register 45 will pass through the data output from cache data 22 to square root buffer 48, the data in turn is forwarded through MUX 63 to Q' buffer 29 as the result of the square root operation (step 422).

If the operand X' is partially matched, the select and mask logic 43 selects the Det_1, Det_2, . . . Det_n signal having the most consecutive most significant bit (MSB) matches (step 424). The detect logic 42 renders 'don't care' any data after the first most significant zero in the data of M1 to Mn. FIG. 4 illustrates the M1 to Mn inputs and corresponding Det_1 to Det_n outputs from detect logic 42. The select and mask logic 43 receives the Det_1 to Det_n signals and performs a masking operation, which generates a pass-through signal for every two consecutive logic ones in Det_1 to Det_n. In the case wherein Det_n are all ones, no masking is performed. A mask table of Det_1 to Det_n inputs and corresponding Mask input from the select and mask logic 43. In FIG. 4, an 8 bit Mask data Mask [7:0] is illustrated. The select and mask logic 43 outputs enable signal En to access the location in cache data 22 corresponding to the most similar pattern Det_max. The Mask data Mask [7:0] corresponding to Det_Max is input to partial output unit 45, wherein an AND operation is performed for this Mask data corresponding to Det_max and the data output Qi read out from the cache data 22 (step 426).

An example is used to illustrate the above process. Operands $10000000_2$, $10001111_2$, and $10101111_2$ are stored in T1 to Tn of the cache tag 21 and the resultant square root data corresponding to the operands are stored in corresponding locations of the cache data memory 22. Radicand X' of $10000001_2$ to be square rooted is input to the arithmetic device. The detect logic 42 receives signals corresponding to the operands as 11111110, 11110xxx, and 1110xxxx, respectively and output patterns Det_1 to Det_n corresponding to the comparing results as 11111110, 11110000, and 11000000, respectively. Hence, a logic '1' signifies that corresponding bits of the operands stored in T1 to Tn and the radicand X' are matched, and '0' means corresponding bits are not matched, respectively. In addition, 'x' means don't care.

The patterns Det_1=11111110, Det_2=11110000, and Det_3=11000000 generated from the detect logic 42 are input to the select and mask logic 43 and the Det_1 pattern 11111110 is selected as a most similar pattern Det_max, which has the most consecutive MSB bits the same as the corresponding bits of radicand X'. According to the truth table shown in FIG. 4, the select and mask 43 generates a mask pattern Mask of 11100000 corresponding to Det_max of 11111110. An output enable signal En is sent to the data cache memory 22 to output resultant data Qi corresponding to the Det_max which was Det_1, having data of 11111110.

The partial output unit 45 performs an AND operation between Qi and the Mask data of 11100000 and stores q [x:0] in buffer 48. As previously explained, if all of the detection signals Det_1 to Det_n from the detect logic 42 are $0xxxxxxx_2$, all zeros are input to the Q' buffer 29 as an initial value and the operand X' is input to the square root module 27. The arithmetic operation, in this example, a square root calculation for all digits of the operand X', is performed in an arithmetic module 27 (in this example, a square root module). And if one of the operands T1 to Tn stored in the cache tag 21 is the same as the radicand X'; in other words, if one of the detection signals Det_1 to Det_n from the detect logic 42 is 11111111, the Qi data corresponding to the detection signal 11111111 is output from cache data 22 as the resultant data Q', without any calculation or processing from module 27.

Intermediate circuitry including operator partition unit 61, a first multiplexer 62 and a second multiplexer 63 is controlled by select and mask logic 43 to transfer data to module 27 and Q' buffer 29. The operator partition unit 61 is used for extracting a partial operand X" which is largely the non-matched portion of radicand X'. In a square root calculation, the partial resultant square root data q [x:0] is squared and then subtracted from the input radicand X' to obtain a partial radicand X". ($X"=X'-q^2$). The partial X" is input to module 27 to perform the square root operation. The partial resultant output q [x:0] is input to the Q' buffer 29 as partial resultant data (step 428). The X" and q [x:0] data are selected through mux 62 and 63, respectively under control of select and mask logic 43. Upon module 27 completing the square root process on the partial X" input, the resultant data is combined with the partial resultant data stored in Q' buffer 29 to form a complete resultant square root data.

Advantageously, the partial output, partial match method according to the present invention can be shown to significantly reduce system throughput when arithmetic operations are frequently performed.

Although the example above illustrates a square root operation, it is readily apparent to one ordinarily skilled in the art that the device as shown and described in FIG. 2 can be applicable to other arithmetic operations such as square root, division, multiplication, trigonometric functions and so on, with minor modifications within the knowledge of one skilled in the art. A square root calculation can be described as $$Q=\sqrt{\sqrt{X}}$$

$$r_i=2r_{i-1}-q_i(2Q_{i-1}q_i 2^{-1})$$

A division is $$Q = \frac{X}{Y}$$

$$r_i 2r_{i-1} q_i D$$

As an illustration, if X=11101001, Y=K, and if new operand X'=11111011, and Y'=K, the same as Y, the division operation is similar to the square root operation except that there are two operands X and Y for a division. If a new operand Y' is identical to the previous operand Y, the division can be considered as a unary operation, and the division can be performed with the PMPO cache 100.

Figure 6:
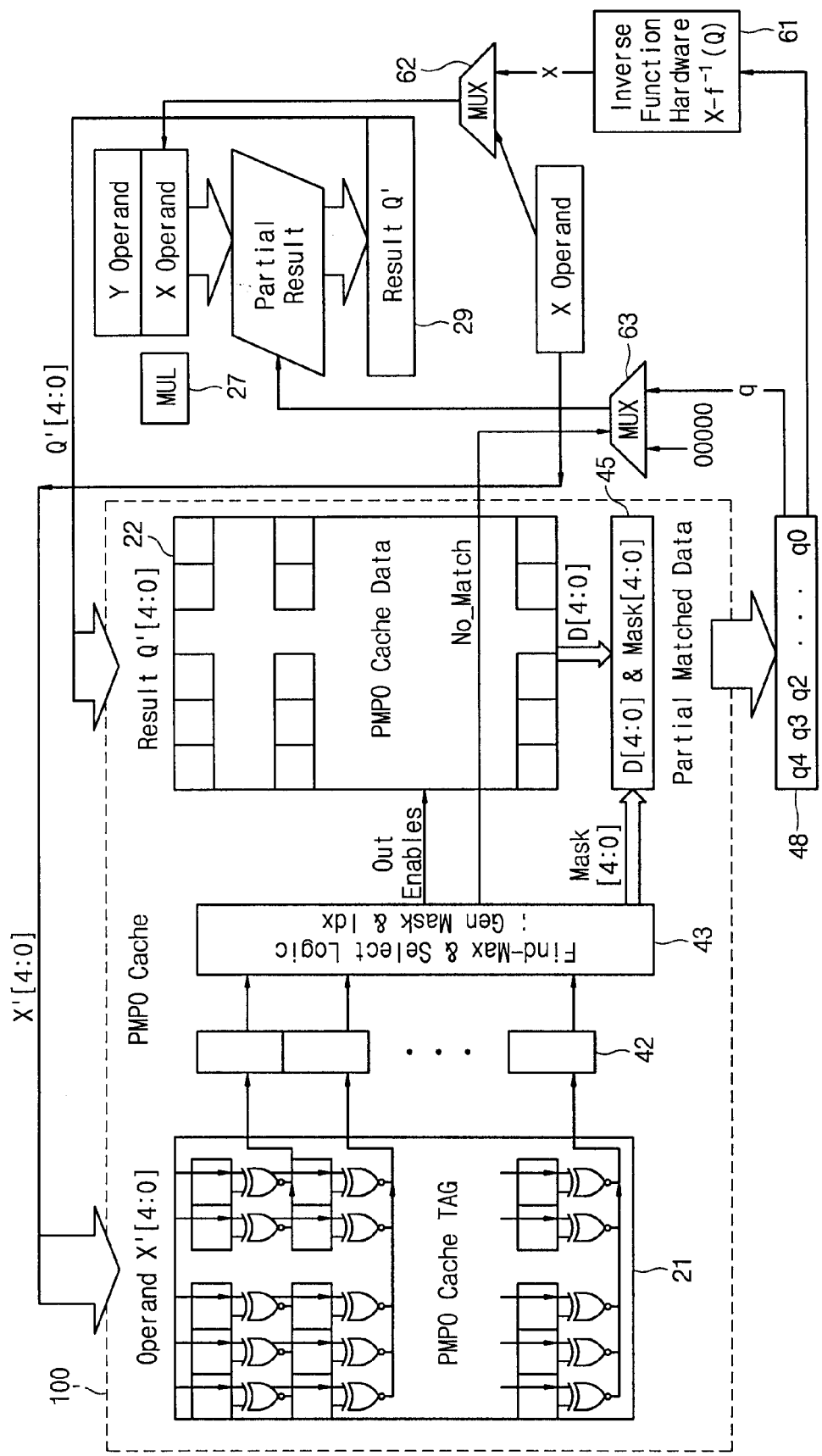
FIG. 6 is an arithmetic device according to another embodiment of the present invention.

For multiplication, Q=X×Y, if X=11101001, Y=K, and if X'=11111011, Y'=K, the same as Y, a partial multiplication can be performed by the PMPO cache according to the present invention. FIG. 5 illustrates that the masking operation is valid only if (X xor X') AND X=0000_0000. Referring to FIG. 6, which is a modified version of the device of FIG. 2, with like numeral designations describing same operations as for components having the same numerals shown in FIG. 2, the inverse function 61 is modified to perform X"=X–X for extracting the partial operand.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of performing arithmetic operation using a cache structure having a TAG register and a cache data memory, the method comprising the steps of:

storing in the TAG register a plurality of known operands, each having a corresponding resultant derived from an arithmetic operation, the resultant being stored in a corresponding location in the cache data memory;

inputting a new operand on which the arithmetic operation is to be performed to the TAG register;

comparing the new operand to the plurality of the known operands;

determining if the new operand matches any of the known operands and if there is a match, outputting from the cache data memory the known resultant corresponding to the known operand that matched the new operand;

if there is no match in the determining step, determining if there are partial matches between the known operands and the new operand;

selecting the known operand having the MSBs matching the MSBs of the new operand;

accessing from the cache data memory the resultant corresponding to the known operand having the most matched MSBs;

determining a first portion of the accessed resultant derived from the matched MSBs of the known operand;

masking a second portion of the accessed resultant which is other than the first portion; and providing as a first partial resultant the masked resultant.

2. The method according to claim 1, further including the steps of performing the arithmetic operation on bits of the new operand other than the matched MSBs to produce a second partial resultant; and outputting a complete resultant by combining the first partial resultant with the second partial resultant.

3. The method according to claim 1, wherein the arithmetic operation is a square root of the new operand.

4. The method according to claim 1, wherein the arithmetic operation is a division wherein the new operand is the dividend.

5. The method according to claim 1, wherein the arithmetic operation is a multiplication wherein the new operand is the multiplicant.

6. A cache device for performing arithmetic operation comprising:

a tag register for storing a plurality of known operands, each having a corresponding resultant derived from an arithmetic operation;

a cache data memory for storing resultants corresponding to the known operands;

comparison logic in the tag register for comparing a new operand on which the arithmetic operation is to be performed against the plurality of the known operands, wherein if the new operand matches any of the known operands, the cache data memory outputs the known resultant corresponding to the known operand that matched the new operand;

a logic group detector for detecting a group of data having a common logic level, the logic group detector for detecting the known operand having the highest number of MSBs matching the MSBs of the new operand;

masking logic for partially masking the resultant corresponding to the known operand having the most matched MSBs, the masking logic for passing a first portion of the corresponding resultant derived from the matched MSBs of the known operand and for masking a second portion of the corresponding resultant which is other than the first portion; and a multiplexer for multiplexing the first portion of the corresponding resultant into an arithmetic unit.

7. The cache device according to claim 6, further including a second multiplexer, wherein the arithmetic unit performs the arithmetic operation on bits of the new operand other than the matched MSBs to produce a second portion resultant, the second multiplexer for multiplexing the second portion resultant into the arithmetic unit, wherein the second portion resultant is combined to the first portion resultant to form a complete resultant.

8. A cache device for performing arithmetic operation comprising:

a tag register for storing a plurality of known operands, each having a corresponding resultant derived from an arithmetic operation;

a cache data memory for storing resultants corresponding to the known operands;

comparison logic in the tag register for comparing a new operand on which the arithmetic operation is to be performed against the plurality of the known operands, wherein if the new operand matches any of the known operands, the cache data memory outputs the known resultant corresponding to the known operand that matched the new operand; and partial match logic for detecting, when there is no exact match, a partial match in a data pattern of at least a predetermined number of bits between a new operand and one of the plurality of the known operands, wherein a partial match resultant corresponding to a partial matched one of the plurality of the known operands is read from the cache data memory and at least a portion of the partial match resultant is input to an arithmetic unit.

9. The cache device according to claim 8, wherein the partial match logic comprises:

a detector for detecting the known operand having the highest number of MSBs matching the MSBs of the new operand;

masking logic for partially masking the resultant corresponding to the known operand having the most matched MSBs, the masking logic for passing a first portion of the corresponding resultant derived from the matched MSBs of the known operand and for masking a second portion of the corresponding resultant which is other than the first portion; and a multiplexer for multiplexing the first portion of the corresponding resultant into an arithmetic unit.

10. The cache device according to claim 9, further including a second multiplexer, wherein the arithmetic unit performs the arithmetic operation on bits of the new operand other than the matched MSBs to produce a second portion resultant, the second multiplexer for multiplexing the second portion resultant into the arithmetic unit, wherein the second portion resultant is combined to the first portion resultant to form a complete resultant.

11. A method of performing arithmetic operation using a cache structure having a TAG register and a cache data memory, the method comprising the steps of:

storing in the TAG register a plurality of known operands, each having a corresponding resultant derived from an arithmetic operation, the resultant being stored in a corresponding location in the cache data memory;

inputting a new operand on which the arithmetic operation is to be performed to the TAG register;

comparing the new operand to the plurality of the known operands;

determining if the new operand matches any of the known operands and if there is a match, outputting from the cache data memory the known resultant corresponding to the known operand that matched the new operand; and if there is no match in the determining step, determining partial matches between the known operands and the new operand;

accessing from the cache data memory a partial match resultant corresponding to a known operand having a partial match; and outputting at least a portion of the partial match resultant to an arithmetic unit.

12. The method according to claim 11, wherein a partial match is a match of at least a predetermined number of MSBs of the new operand and the known operands.

13. The method according to claim 11, wherein the step of determining partial matches comprises selecting the known operand having the most MSBs matching the MSBs of the new operand; and the step of outputting comprises:

determining a first portion of the accessed resultant derived from the matched MSBs of the known operand;

masking a second portion of the accessed resultant which is other than the first portion; and providing as a first partial resultant the masked resultant.

14. The method according to claim 13, further including the steps of performing the arithmetic operation on bits of the new operand other than the matched MSBs to produce a second partial resultant; and outputting a complete resultant by combining the first partial resultant with the second partial resultant.

15. The method according to claim 11, wherein the arithmetic operation is a square root of the new operand.

16. The method according to claim 11, wherein the arithmetic operation is a division wherein the new operand is the divisor.

17. The method according to claim 11, wherein the arithmetic operation is a multiplication wherein the new operand is the multiplicant.

\* \* \* \* \*